United States Patent [19]

Matsuhiro et al.

[11] Patent Number: 5,049,456

[45] Date of Patent: Sep. 17, 1991

[54] ELECTROCONDUCTIVE INTERCONNECTING MEMBER AND FUEL CELL HAVING THE MEMBER

[75] Inventors: Keiji Matsuhiro, Nagoya; Shigenori Ito, Kasugai; Kiyoshi Okumura, Tajimi, all of Japan

[73] Assignee: NGK Insulators, Ltd., Aichi, Japan

[21] Appl. No.: 516,920

[22] Filed: Apr. 30, 1990

[30] Foreign Application Priority Data

Apr. 28, 1989 [JP] Japan .................................. 1-110814

[51] Int. Cl.$^5$ .............................................. H01M 8/02
[52] U.S. Cl. ........................................ 429/12; 429/31; 252/518
[58] Field of Search ....................... 429/30, 31, 32, 12; 252/518, 519, 520

[56] References Cited

U.S. PATENT DOCUMENTS

| | | |
|---|---|---|
| 4,598,467 | 7/1986 | Isenberg et al. ..................... 429/31 |
| 4,631,238 | 12/1986 | Ruka ..................................... 429/31 |
| 4,749,632 | 6/1988 | Flandermeyer et al. ............. 429/12 |
| 4,830,780 | 5/1989 | Olson et al. ......................... 252/521 |
| 4,861,345 | 8/1989 | Bowker et al. ...................... 429/31 |
| 4,895,576 | 1/1990 | Pal et al. .............................. 429/31 |

*Primary Examiner*—Donald L. Walton
*Attorney, Agent, or Firm*—Parkhurst, Wendel & Rossi

[57] ABSTRACT

A sintered body of a ceramics material consisting essentially of a mixture of lanthanum chromite of the formula of $LaCrO_3$ with an oxide of a specifically limited metal, or consisting essentially of lanthanum chromite, whose Cr is partly replaced by a specifically limited metal, has high mechanical strength and electroconductivity and is very useful as an interconnecting member of fuel cell. A mixture of lanthanum chromite, whose Cr is partly replaced by a specifically limited metal, with an oxide of a specifically limited metal is effective for obtaining a sintered body having high mechanical strength and electroconductivity in a high sinterability.

4 Claims, 2 Drawing Sheets

① $LaCrO_3$ (Comparative Example)
② $LaCrO_3 + TiO_2$ 1 Part by Weight
③ $LaCr_{0.9}Cu_{0.1}O_3$
④ $LaCr_{0.9}Cu_{0.1}O_3 + SiO_2$ 1 Part by Weight

5,049,456

ELECTROCONDUCTIVE INTERCONNECTING MEMBER AND FUEL CELL HAVING THE MEMBER

BACKGROUND OF THE INVENTION

1. Field of the Invention

This invention relates to an electroconductive interconnecting member and a fuel cell having the member.

2. Related Art Statement

There has recently been noticed a fuel cell, particularly a solid electrolyte-type fuel cell, as an electricity-generating device. The fuel cell has a high electricity-generating efficiency, can use various fuels (naphtha, natural gas, methanol, reformed coal gas, heavy oil and the like), is low in the public nuisance, and further is free from the influence by the installation scale upon its electricity-generating efficiency. Therefore, the fuel cell is very hopeful technic.

Particularly, the solid electrolyte-type fuel cell (SOFC) has a very high energy transformation efficiency and other merits. In the SOFC, a large number of fuel cell elements are connected in series, and hence an air electrode of an element in the foregoing stage is connected to a fuel electrode of an element in the next stage through an interconnector. This interconnector does not directly contribute to the electricity generation, and it is desirable to use an interconnector having a resistance as low as possible. For example, it is necessary for an interconnector to have an electroconductivity of not lower than about 1 $S \cdot cm^{-1}$ at 1,000° C. and an electron conductivity of substantially 99-100% at 1,000° C., which is an ordinary operating temperature of SOFC. Further, one of the surfaces of an interconnector is exposed to an oxidizing atmosphere, and the other surface is exposed to a reducing atmosphere. Therefore, the interconnector is required to be a chemically stable material and a dense material free from the leakage of fuel. Further, it is necessary that an interconnector is made of an inexpensive material, does not substantially change its composition under oxidizing atmosphere and reducing atmosphere, does not react with other fuel cell-constituting members at 1,000° C., has a negligibly low ion conductivity, does not cause destructive phase conversion within the temperature range of 25°-1,200° C., is low in the volatilization of oxide component at the operation temperature, and further has a thermal expansion coefficient approximately equal to the thermal expansion coefficients of the solid electrolyte, supporting member and the like.

As the interconnector, there are used $LaCrO_3$, $La_{1-x}Ca_xCrO_3$, $La_{1-x}Sr_xCrO_3$, $LaCr_{1-x}Mg_xO_3$ and the like. However, lanthanum chromite, which is not doped, is not always highly useful. Because, the lanthanum chromite, which is not doped, has an electroconductivity near the lower limit value of its electroconductivity, has a thermal expansion coefficient, which is not matched with the thermal expansion coefficient of other members constituting the fuel cell together with the interconnector, and causes its phase conversion from orthorombic structure to rhombohedral structure at about 275° C. For example, the use of $LaCr_{0.97}Mg_{0.03}O_3$ results in a good electroconductivity, but $LaCr_{0.97}Mg_{0.03}O_3$ is fairly lower in the thermal expansion coefficient at 25°-1,000° C. than zirconia stabilized with calcia, for example $(ZrO_2)_{0.85}(CaO)_{0.15}$, or a solid electrolyte, such as $(ZrO_2)_{0.9}(Y_2O_3)_{0.1}$, which has a high ion conductivity at 1,000° C.

For example, $La_{0.84}Sr_{0.16}CrO_3$ has a good electroconductivity, but $La_{0.84}Sr_{0.16}CrO_3$ is fairly large in the oxygen ion void factor in the case where it is exposed to a fuel atmosphere at a high operating temperature necessary for it to be used in a high-temperature fuel cell. $LaCr_{0.72}Mg_{0.03}Al_{0.25}O_3$ is low in the electroconductivity due to the presence of aluminum ion in a relatively high concentration.

Therefore, there is demanded the development of an interconnector, which has an electroconductivity as high as possible and is well matched with solid electrolyte in the thermal expansion coefficient. Further, the interconnector is required to have a high denseness in view of the structure of SOFC. However, when the powder sintering is effected, $LaCaO_3$, which is not doped, is difficult to be formed into a dense body even by a sintering at 1,600° C. Therefore, the development of a material having a good sinterability at low temperature is desired. Further, it is eagerly demanded that an interconnector having more improved strength as a constituting member of fuel cell is developed to enhance the durability of fuel cell and to improve further the yield in the production of fuel cell.

SUMMARY OF THE INVENTION

The first aspect of the present invention lies in an electroconductive interconnecting member consisting of a ceramics material consisting essentially a mixture of 100 parts by weight of lanthanum chromite having a composition represented by the formula of $LaCrO_3$ with not more than 2.0 parts by weight of the total amount of an oxide or oxides of at least one metal selected from the group consisting of Si, Ti, Fe, Al, Cu, B, Ni, Cr and Mn.

The second aspect of the present invention lies in an electroconductive interconnecting member consisting of the following ceramics material [I] or ceramics material [II], said ceramics material [I] consisting essentially of lanthanum chromite having a composition represented by the formula of $LaCr_{1-x}A_xO_3$ (wherein A represents at least one metal Selected from the group consisting of Cu, Zn, Ni, Fe and Ti, and x is a numeral within the range of $0 < x \leq 0.3$), and said ceramics material [II] consisting essentially of a mixture of 100 parts by weight of lanthanum chromite having a composition represented by the formula of $LaCr_{1-x}A_xO_3$ (wherein A represents at least one metal selected from the group consisting of Cu, Zn, Ni, Fe and Ti, and x is a numeral within the range of $0 < x \leq 0.3$) with not more than 2.0 parts by weight of the total amount of an oxide or oxides of at least one metal selected from the group consisting of Si, Ti, Fe, Al, Cu, B, Ni, Cr and Mn.

The third aspect of the present invention lies in a fuel cell having an electroconductive interconnecting member as an interconnector, said electroconductive interconnecting member consisting essentially of a mixture of 100 parts by weight of lanthanum chromite having a composition represented by the formula of $LaCrO_3$ with not more than 2.0 parts by weight of the total amount of an oxide or oxides of at least one metal selected from the group consisting of Si, Ti, Fe, Al, Cu, B, Ni, Cr and Mn.

The fourth aspect of the present invention lies in a fuel cell having an electroconductive interconnecting member consisting of the following ceramics material [I] or ceramics material [II] as an interconnector, said ceramics material [I] consisting essentially of lanthanum chromite having a composition represented by the formula of $LaCr_{1-x}A_xO_3$ (wherein A represents at least one metal selected from the group consisting of Cu, Zn, Ni, Fe and Ti, and x is a numeral within the range of $0 < x \leq 0.3$), and said ceramics material [II] consisting essentially of a mixture of 100 parts by weight of lanthanum chromite having a composition represented by the formula of $LaCr_{1-x}A_xO_3$ (wherein A represents at least one metal selected from the group consisting of Cu, Zn, Ni, Fe and Ti, and x is a numeral within the range of $0 < x \leq 0.3$) with not more than 2.0 parts by weight of the total amount of an oxide or oxides of at least one metal selected from the group consisting of Si, Ti, Fe, Al, Cu, B, Ni, Cr and Mn.

In the above described electroconductive interconnecting member of the present invention, as the "oxide of metal", oxides of Si, Ti and Fe are more preferably used. The amount of "oxide of metal" contained in the electroconductive interconnecting member is more preferred to be 0.1-1.0 part by weight in the total amount based on 100 parts by weight of lanthanum chromite.

As the metal represented by A, Cu and Zn are more preferably used.

As the range of "x", $0.05 \leq x \leq 0.2$ is more preferable.

DESCRIPTION OF THE PREFERRED EMBODIMENT

Figure 1:
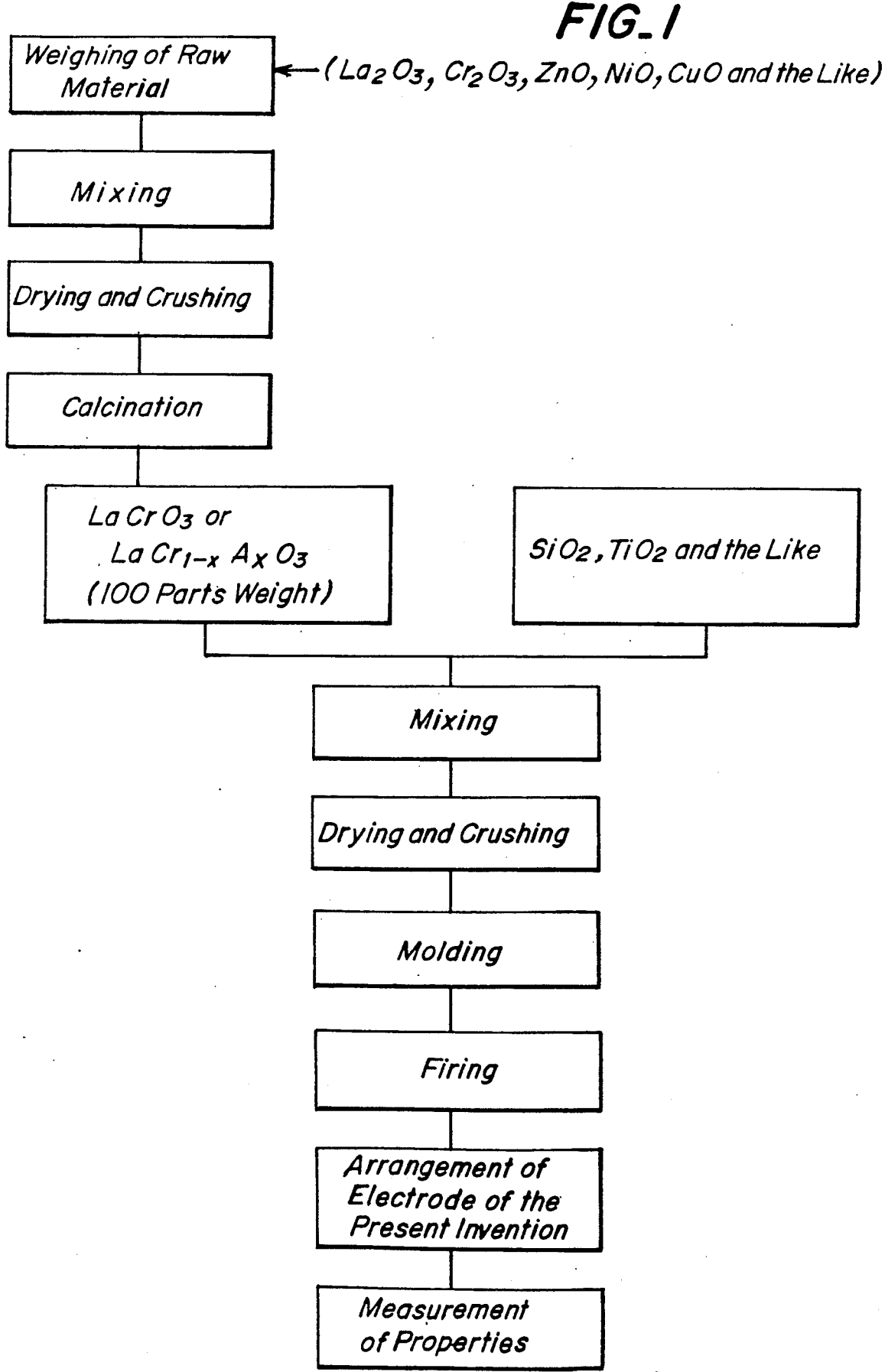
FIG. 1 is a flow chart illustrating the production method of the electroconductive interconnecting member of the present invention.

The essential feature of the present invention lies in that an oxide of a specifically limited metal is added to $LaCrO_3$ in a specifically limited amount. That is, the inventors have made various investigations and experiments with respect to the composition for the material constituting a fuel cell and succeeded in the production of electroconductive interconnecting members, such as interconnector for SOFC and the like, having a high denseness, and in enhancing greatly the mechanical strength and electroconductivity of the electroconductive interconnecting members, by the addition of the above described specifically limited metal oxide to $LaCrO_3$. Moreover, an electroconductive interconnecting member having a thermal expansion coefficient within the tolerable range was able to be produced by the use of not more than 2.0 parts by weight, based on 100 parts by weight of $LaCrO_3$, of the above described specifically limited metal oxide. When the amount of the metal oxide is more than 2.0 parts by weight, the resulting electroconductive interconnecting member is low in the electroconductivity and in the mechanical strength.

Furthermore, when Cr in $LaCrO_3$ is replaced by the above described specifically limited amount of the above described specifically limited metal, the same effect as that attained by the addition of the metal oxide to $LaCrO_3$ can be attained. That is, when such lanthanum chromite is used, the resulting electroconductive interconnecting member has a high denseness and remarkably improved mechanical strength and electroconductivity. Moreover, it is very important to effect the above described replacement under a condition of $x \leq 0.3$. When x is larger than 0.3, the doping of the above described specifically limited metal to the Cr-position of $LaCrO_3$ is difficult, and the resulting ceramics material is not formed of perovskite single phase, but has a thermal expansion coefficient beyond the tolerable range, and further has low mechanical strength and low electroconductivity. The reason of the densification is probably due to the fact that $LaCrO_3$ itself or a part of $LaCrO_3$ has been formed into low melting point substance, and the sintering has been proceeded in this portion. Further, although one of the reasons of the high-strengthening lies in the lowering of the porosity, it is probable that the variations of $LaCrO_3$ in the material and in the microstructure also contribute to the improvement of the strength.

When a fuel cell electricity generator is produced by connecting a fuel cell, in which the above described specifically limited electroconductive interconnecting element is used as an interconnector of the fuel cell, the electroconductive interconnecting element has a high denseness, and hence the leakage of air or fuel can be decreased to a very small amount, the power consumption can be more decreased, and further the connecting portion has a high strength, and the yield in the production process of fuel cell is increased.

The present invention will be explained in more detail.

First, an explanation will be made with respect to fuel cell.

The fuel cell is a device which can directly convert the chemical energy possessed by fuel to electric energy, and is free from the restriction by Carnot's cycle. Therefore, the fuel cell has such merits that it has inherently a high energy conversion efficiency, and is good in the environmental maintenability.

Moreover, the solid electrolyte-type fuel cell (SOFC) operates at a high temperature of 1,000° C., and hence the electrode reaction is very active, a noble metal catalyst, such as expensive platinum or the like, is not at all necessary, the polarization is small, and the output voltage is relatively high. Therefore, the SOFC is very higher than other fuel cells in the energy conversion efficiency. Further, the SOFC are wholly made of solid materials, and hence the SOFC is stable and is long in its life.

An SOFC unit cell generally consists of air electrode, solid electrolyte and fuel electrode. An interconnector is used in the series connection of unit cells.

The present invention relates to a ceramics interconnecting member which is optimum as an interconnector for SOFC, and a solid electrolyte-type fuel cell having the ceramics interconnecting member as an interconnector.

When the ceramics interconnecting member of the present invention is used as an interconnector of an SOFC, the strength of the interconnector is increased, and the peeling, flaw and breakage of the interconnector are decreased during the production of the SOFC and during the electricity-generating operation of the SOFC. Moreover, the ceramics interconnecting member can be made into a dense body, and hence the leakage of air and fuel can be decreased to a small amount, resulting in the improvement of utilizing efficiency of fuel. Moreover, the ceramics interconnecting member can be made into a thin film, and further the member itself has a high electroconductivity, and hence the consumption of electric power in the connecting portion of the cells can be more decreased.

A general method for synthesizing lanthanum chromite is described in U.S. Pat. No. 4,035,266 specification (Alexandrof et al). The raw materials used in the synthesis for the specifically limited ceramics material to be used in the electroconductive interconnecting member of the present invention are present in the form of separate oxides, in the form of carbide, sulfate, formate and hydroxide, which are decomposed into oxide through heating, or in the form of a chemical mixture, which is formed from the precipitate obtained from a solution. The ceramics material can be also produced by various commonly known technics for producing mixed oxide ceramics, which technics include technics, wherein component metal ion species are mixed, pressed, reacted and sintered. As the other method, there is known a method, wherein an organic resin is formed, and the organic resin is decomposed at high temperature under an oxygen-containing atmosphere, such as air or the like. The ceramics material can also be produced by a chemical vapor deposition method.

The following examples are given for the purpose of illustration of this invention, and are not intended as limitations thereof.

In the examples, the production method of the electroconductive interconnecting member of the present invention and the evaluation method of the strength thereof will be explained.

EXAMPLE 1

In a ball mill of 2 l capacity were mixed 120.0 g of $La_2O_3$ having a purity of 99.9% and 56.3 g of $Cr_2O_3$ having a purity of 99.3% together with 800 g of pebble and 200 g of water for 3 hours to produce a slurry. After the slurry was dried at 110° C. for 20 hours, the dried mass was crushed into powders having a particle size of not larger than 149 μm, and the resulting powders were calcined at 1,200° C. for 10 hours in air to synthesize $LaCrO_3$. The starting materials for the synthesis of $LaCrO_3$ are not limited to oxide, but may be carbonate, nitrate, acetate, sulfate, hydroxide and the like. Further, as the synthesis method, not only the above described solid phase reaction method, but also a coprecipitation method from solution, and a thermal decomposition method of organic carboxylic acid salt can be carried out. To 100 parts by weight of the resulting $LaCrO_3$ was added 0.1–3.0 parts by weight of each of $SiO_2$, $TiO_2$, $Fe_2O_3$, $CuO$, $Al_2O_3$, $B_2O_3$, $NiO$, $Cr_2O_3$, $MnO_2$ and the like, all of which had a purity of 99.9%, to obtain a mixture. To this mixture was added 100 parts by weight of water, and the resulting mixture was further mixed and pulverized for 20 hours in a ball mill, and then dried and crushed to obtain powders. The resulting powders were press molded in a metal mold under a pressure of 200 kgf/cm$^2$, and the press molded article was further pressed by a rubber press method under a pressure of 2.5 t/cm$^3$ to obtain a shaped article having a dimension of 60 mm × 60 mm × 8 mm. The resulting shaped article was fired at 1,450° C. for 10 hours in air to obtain an interconnecting member illustrated in the following Table 1.

The resulting interconnecting member was subjected to the following property tests. The obtained results are shown in Table 1.

Four-point flexural strength: The four-point flexural strength of an interconnecting member sample was measured according to the four-point flexural strength test method described in "Test method of flexural strength of fine ceramics" in JIS R-1601. Sample shape was 3 × 4 × 10 mm. Outerside span was 30 mm. Innerside span was 10 mm.

Thermal expansion coefficient: An interconnecting member sample having a shape of ϕ5 × 50 mm was used, and the thermal expansion coefficient thereof was measured within the temperature range of 40°–900° C. by means of a TMA-2S type thermal dilatometer made by Rigaku K.K.

Electroconductivity: Four platinum wires were arranged at an interval of 5 mm on an interconnecting member sample having a shape of ϕ30 × 6 mm, and the electroconductivity of the interconnecting member sample was measured by a direct current four probe method in air at a temperature of 1,000° C.

Porosity: The porosity of the open pores of an interconnecting member sample was measured by a water substitution method.

FIG. 1 illustrates a flow chart of the production process of an interconnecting member described in Example 1 described above or Example 2 explained later.

TABLE 1

| Lanthanum chromite | Additive | | Electro-conductivity (S cm$^{-1}$) at 1,000° C. | Thermal expansion coefficient (× 10$^{-6}$ K$^{-1}$) at 40~900° C. | Four-point flexural strength (kgf/mm$^2$) at room temperature | Porosity (%) |
|---|---|---|---|---|---|---|
| $LaCrO_3$ | $SiO_2$ | 0.1 weight part | 8.1 | 8.7 | 11.9 | 3.1 |
| | (Comparative example) | 1.0 weight part | 8.5 | 8.4 | 12.1 | 3.5 |
| | | 2.0 weight parts | 8.1 | 8.4 | 10.8 | 6.6 |
| | | 3.0 weight parts | 5.8 | 8.0 | 8.2 | 16.2 |
| | $TiO_2$ | 0.1 weight part | 8.2 | 8.8 | 13.2 | 4.2 |
| | (Comparative example) | 1.0 weight part | 9.0 | 8.3 | 14.0 | 4.3 |
| | | 2.0 weight parts | 8.3 | 8.2 | 12.9 | 6.5 |
| | | 3.0 weight parts | 3.0 | 8.4 | 6.2 | 14.1 |
| | $Fe_2O_3$ | 0.1 weight part | 8.2 | 8.5 | 11.6 | 5.1 |
| | (Comparative example) | 1.0 weight part | 8.9 | 8.4 | 12.3 | 6.1 |
| | | 2.0 weight parts | 8.4 | 8.1 | 10.3 | 8.8 |
| | | 3.0 weight parts | 5.0 | 8.4 | 8.0 | 16.9 |
| | $Al_2O_3$ | 0.3 weight part | 8.0 | 8.7 | 9.5 | 5.1 |
| | $B_2O_3$ | 0.3 weight part | 8.2 | 8.8 | 8.8 | 4.8 |
| | $CuO$ | 0.3 weight part | 8.1 | 8.7 | 10.4 | 4.2 |
| | $NiO$ | 0.5 weight part | 8.2 | 8.7 | 9.2 | 6.4 |
| | $Cr_2O_3$ | 0.5 weight part | 8.3 | 8.6 | 8.6 | 4.3 |
| | $MnO_2$ | 0.5 weight part | 8.1 | 8.7 | 8.1 | 5.7 |

TABLE 1-continued

| Lanthanum chromite | Additive | | Electro-conductivity (S cm$^{-1}$) at 1,000° C. | Thermal expansion coefficient ($\times 10^{-6}$ K$^{-1}$) at 40~900° C. | Four-point flexural strength (kgf/mm$^2$) at room temperature | Porosity (%) |
|---|---|---|---|---|---|---|
| LaCrO$_3$ (Comparative example) | None | 0 weight part | 8.3 | 8.9 | 2.5 | 38.4 |

EXAMPLE 2

In a ball mill of 2 l capacity were mixed 120.0 g of La$_2$O$_3$ having a purity of 99.9%, 50.7 g of Cr$_2$O$_3$ having a purity 99.3%, 5.9 g of CuO having a purity of 99.5% together with 800 g of pebble and 200 g of water for 3 hours to produce a slurry. After the slurry was dried at 110° C. for 20 hours, the dried mass was crushed into powders having a particle size of not larger than 149 μm, and the resulting powders were calcined at 1,200° C. for 10 hours in air to synthesize lanthanum chromite having a composition represented by the formula of LaCr$_{0.9}$Cu$_{0.1}$O$_3$. In the same manner as described in the synthesis of the lanthanum chromite of LaCr$_{0.9}$Cu$_{0.1}$O$_3$, lanthanum chromites, each having a composition represented by the formula of LaCr$_{0.95}$Cu$_{0.05}$O$_3$, LaCr$_{0.8}$Cu$_{0.2}$O$_3$ or LaCr$_{0.7}$Cu$_{0.3}$O$_3$, were synthesized by mixing the starting materials in a compounding recipe so as to obtain the respective lanthanum chromites. Further, ZnO, NiO, Fe$_2$O$_3$ or TiO$_2$ was used in place of CuO, and lanthanum chromites having compositions illustrated in the following Table 2 were synthesized. The starting materials are not limited to oxide, but may be carbonate, nitrate, acetate, sulfate, hydroxide and the like similarly to the case of Example 1. Further, as the synthesis method, not only the above described solid phase reaction method, but also a coprecipitation method from solution, and a thermal decomposition method of organic carboxylic acid salt can be carried out. To 100 parts by weight of the resulting lanthanum chromite was added 0.1-3.0 parts by weight of each of SiO$_2$, TiO$_2$, Fe$_2$O$_3$, CuO, Al$_2$O$_3$, B$_2$O$_3$, NiO, Cr$_2$O$_3$ and MnO$_2$, all of which had a purity of 99.9%, to obtain a mixture. To this mixture was added 100 parts by weight of water, and the resulting mixture was further mixed and pulverized for 20 hours in a ball mill, and then dried and crushed to obtain powders. The resulting powders were press molded in a metal mold under a pressure of 200 kgf/cm$^2$, and the press molded article was further pressed by a rubber press method under a pressure of 2.5 t/cm$^2$ to obtain a shaped article having a dimension of 60 mm×60 mm×8 mm. The resulting shaped article was fired at 1,450° C. for 10 hours in air to obtain an interconnecting member illustrated in the following Table 2.

The resulting interconnecting member was subjected to the property tests in the same manner as described in Example 1. The obtained results are shown in Table 2.

TABLE 2 (a)

| Lanthanum chromite | Additive | | Electro-conductivity (S cm$^{-1}$) at 1,000° C. | Thermal expansion coefficient ($\times 10^{-6}$ K$^{-1}$) at 40~900° C. | Four-point flexural strength (kgf/mm$^2$) at room temperature | Porosity (%) |
|---|---|---|---|---|---|---|
| LaCr$_{0.95}$Cu$_{0.05}$O$_3$ | SiO$_2$ | 0 weight part | 11.9 | 8.5 | 12.9 | 2.4 |
| | (Comparative example) | 1.0 weight part | 12.0 | 8.4 | 15.0 | 1.1 |
| | | 2.0 weight parts | 11.2 | 8.4 | 13.0 | 1.5 |
| | | 3.0 weight parts | 8.3 | 8.1 | 5.1 | 7.9 |
| LaCr$_{0.9}$Cu$_{0.1}$O$_3$ | SiO$_2$ | 0 weight part | 12.2 | 8.2 | 12.7 | 2.3 |
| | (Comparative example) | 1.0 weight part | 12.3 | 8.3 | 15.3 | 1.2 |
| | | 2.0 weight parts | 11.0 | 8.1 | 13.4 | 1.5 |
| | | 3.0 weight parts | 6.4 | 8.5 | 6.8 | 9.9 |
| LaCr$_{0.8}$Cu$_{0.2}$O$_3$ | SiO$_2$ | 0 weight part | 13.0 | 8.4 | 12.7 | 2.1 |
| | (Comparative example) | 1.0 weight part | 13.2 | 8.1 | 17.0 | 1.5 |
| | | 2.0 weight parts | 12.0 | 8.4 | 16.9 | 1.4 |
| | | 3.0 weight parts | 6.4 | 8.4 | 6.2 | 4.7 |
| LaCr$_{0.7}$Cu$_{0.3}$O$_3$ | SiO$_2$ | 0 weight part | 13.4 | 8.5 | 10.2 | 2.2 |
| | (Comparative example) | 1.0 weight part | 13.3 | 8.5 | 14.9 | 1.2 |
| | | 2.0 weight parts | 12.1 | 8.6 | 14.0 | 1.6 |
| | | 3.0 weight parts | 7.2 | 8.3 | 7.3 | 4.8 |
| LaCrO$_3$ (Comparative example) | None | 0 weight part | 8.3 | 8.9 | 2.5 | 38.4 |

TABLE 2(b)

| Lanthanum chromite | Additive | | Electro-conductivity (S cm$^{-1}$) at 1,000° C. | Thermal expansion coefficient ($\times 10^{-6}$ K$^{-1}$) at 40~900° C. | Four-point flexural strength (kgf/mm$^2$) at room temperature | Porosity (%) |
|---|---|---|---|---|---|---|
| LaCr$_{0.95}$Zn$_{0.05}$O$_3$ | Fe$_2$O$_3$ | 0 weight part | 11.9 | 8.5 | 9.9 | 2.3 |
| | (Comparative example) | 0.2 weight part | 12.2 | 8.5 | 15.8 | 1.0 |
| | | 1.0 weight part | 12.0 | 8.4 | 15.0 | 1.1 |
| | | 3.0 weight parts | 8.3 | 8.1 | 4.1 | 7.8 |
| LaCr$_{0.9}$Zn$_{0.1}$O$_3$ | Fe$_2$O$_3$ | 0 weight part | 12.4 | 8.5 | 8.7 | 2.3 |
| | (Comparative example) | 0.2 weight part | 12.3 | 8.4 | 15.8 | 1.2 |

TABLE 2(b)-continued

| Lanthanum chromite | Additive | | Electro-conductivity (S cm$^{-1}$) at 1,000° C. | Thermal expansion coefficient ($\times 10^{-6}$ K$^{-1}$) at 40~900° C. | Four-point flexural strength (kfg/mm$^2$) at room temperature | Porosity (%) |
| --- | --- | --- | --- | --- | --- | --- |
| | | 1.0 weight part | 12.3 | 8.4 | 16.3 | 1.4 |
| | | 3.0 weight parts | 7.1 | 8.4 | 5.8 | 10.6 |
| LaCr$_{0.8}$Zn$_{0.2}$O$_3$ | Fe$_2$O$_3$ | 0 weight part | 13.3 | 8.3 | 10.2 | 2.2 |
| | (Comparative example) | 0.2 weight part | 13.1 | 8.2 | 16.5 | 1.5 |
| | | 1.0 weight part | 13.1 | 8.3 | 16.0 | 2.1 |
| | | 3.0 weight parts | 7.5 | 8.1 | 6.1 | 8.1 |
| LaCr$_{0.7}$Zn$_{0.3}$O$_3$ | Fe$_2$O$_3$ | 0 weight part | 13.4 | 8.7 | 9.2 | 2.1 |
| | (Comparative example) | 0.2 weight part | 13.2 | 8.4 | 13.5 | 1.3 |
| | | 1.0 weight part | 13.3 | 8.4 | 13.0 | 1.2 |
| | | 3.0 weight parts | 7.2 | 8.5 | 6.1 | 5.7 |
| LaCr$_{0.6}$Zn$_{0.4}$O$_3$ (Comparative example) | None | 0 weight part | Degraded | | | |

TABLE 2 (c)

| Lanthanum chromite | Additive | | Electro-conductivity (S cm$^{-1}$) at 1,000° C. | Thermal expansion coefficient ($\times 10^{-6}$ K$^{-1}$) at 40~900° C. | Four-point flexural strength (kfg/mm$^2$) at room temperature | Porosity (%) |
| --- | --- | --- | --- | --- | --- | --- |
| LaCr$_{0.8}$Cu$_{0.2}$O$_3$ | SiO$_2$ | 0 weight part | 12.1 | 8.4 | 10.1 | 4.1 |
| | | 2.0 weight parts | 11.2 | 8.4 | 12.0 | 1.5 |
| LaCr$_{0.8}$Zn$_{0.2}$O$_3$ | SiO$_2$ | 0 weight part | 12.2 | 8.5 | 14.3 | 1.2 |
| | | 2.0 weight parts | 11.1 | 8.4 | 12.3 | 1.5 |
| LaCr$_{0.7}$Ni$_{0.3}$O$_3$ | SiO$_2$ | 0 weight part | 20.2 | 9.0 | 12.2 | 10.2 |
| | | 2.0 weight parts | 13.3 | 8.7 | 10.8 | 5.6 |
| LaCr$_{0.9}$Ti$_{0.1}$O$_3$ | None | 0 weight part | 11.2 | 8.3 | 6.2 | 20.2 |
| LaCr$_{0.9}$Fe$_{0.1}$O$_3$ | None | 0 weight part | 13.3 | 8.6 | 5.0 | 25.6 |
| LaCrO$_3$ (Comparative example) | None | 0 weight part | 8.3 | 8.9 | 2.5 | 38.4 |

As illustrated in Tables 1 and 2, the interconnecting member of the present invention is remarkably higher in the strength than the interconnecting member of comparative example only when LaCrO$_3$ is mixed with a specifically limited amount of a specifically limited metal oxide, or Cr in LaCrO$_3$ is partly replaced by a specifically limited amount of a specifically limited metal. Moreover, the interconnecting member of the present invention is substantially the same in the thermal expansion coefficient as the interconnecting member of comparative example. Although some of the interconnecting members of the present invention is a little lower in the thermal expansion coefficient than the comparative interconnecting member, this lowering lies within the tolerable range in view of the remarkable improvement of strength in the interconnecting member of the present invention. An important point is that the above described addition of metal oxide to LaCrO$_3$ or the above described partial replacement of Cr in LaCrO$_3$ results in an interconnecting member having a porosity lower than the porosity of a comparative interconnecting member, and that, when the above described addition of metal oxide and partial replacement of Cr are concurrently carried out, the resulting interconnecting member has a very low porosity and has a greatly improved sinterability. That is, when the above obtained interconnecting member is used in the interconnector of SOFC, a dense interconnector can be obtained at a low temperature, and hence loss due to the leakage of fuel and air is decreased. Therefore, the interconnecting member of the present invention is very effective for improving the utilization rate of fuel.

Figure 2A:
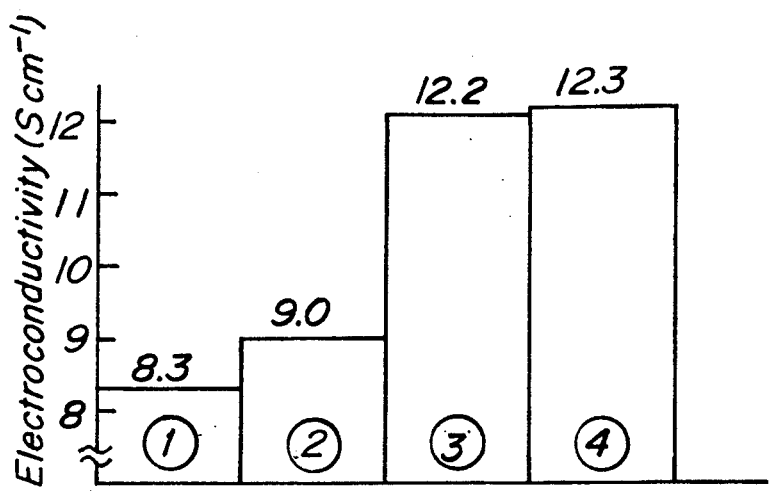
FIGS. 2A, 2B and 2C are graphs illustrating the properties of the electroconductive interconnecting members produced in Examples and an electroconductive interconnecting member of comparative example.
Figure 2B:
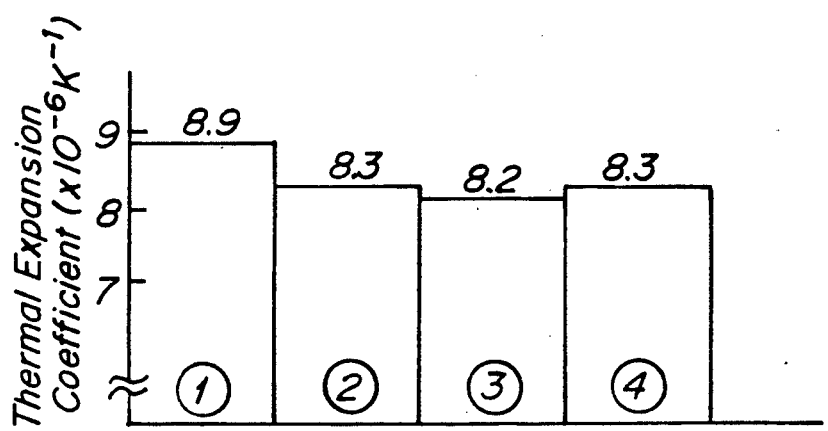
Figure 2C:
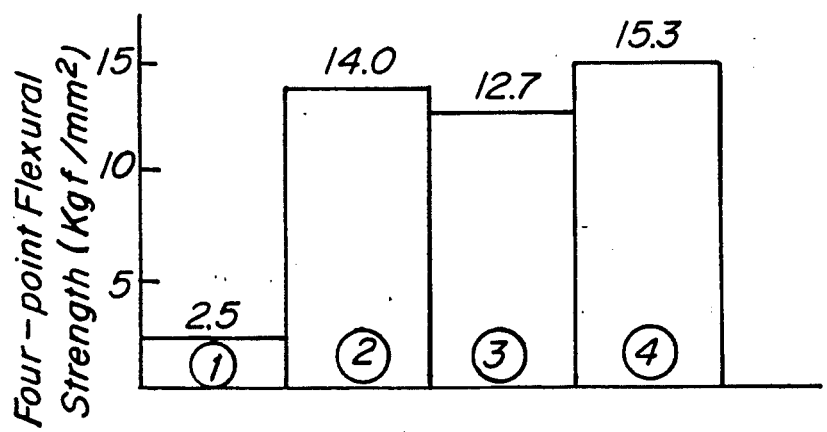

FIGS. 2A, 2B and 2C are graphs illustrating the properties of typical members ②, ③ and ④ of interconnecting members produced in Examples 1 and 2 and an interconnecting member ① of comparative example.

EXAMPLE 3

Among the interconnecting members produced in Examples 1 and 2, typical interconnecting members were used, and their permeability coefficient for air was measured.

The measuring method is as follows.

An interconnecting member was worked into a test piece having a diameter of 50 mm and a length of 8 mm, and the outer peripheral surface thereof was sealed by means of an adhesive.

The test piece was clamped by a jig such that a pressurized air was able to be blown into the test piece form one side and the flow rate of air flowed out from the other side of the test piece was able to be measured by a mass flow meter. The aperture area was an area defined by a circle having a diameter of 45 mm. The pressure difference of air between the blow-in side and the measuring side was kept to $2 \times 10^{-2}$ kgf/cm$^2$. The permeability coefficient (K (cm$^2$)) for air of the test piece was calculated by the following equation.

$$K = (\mu \cdot t \cdot Q)/(\Delta P \cdot A)$$

In the equation:
$\mu$: viscosity coefficient of air (kgf·s/cm$^2$),
t: sample thickness (cm),
Q: measuring flow rate (cm$^3$/s),
$\Delta P$: pressure difference (kgf/cm$^2$), and
A: Aperture area (cm$^2$).

TABLE 3

| Interconnecting member | Permeability coefficient for air, K ($cm^2$) |
| --- | --- |
| $LaCrO_3$ (Comparative example) | $2.0 \times 10^{-11}$ |
| $LaCr_{0.9}Cu_{0.1}O_3$ | $1.0 \times 10^{-13}$ |
| $LaCrO_3$ + 1.0 weight part $SiO_2$ | $1.5 \times 10^{-13}$ |

As illustrated in Table 3, the interconnecting member of the present invention has a permeability coefficient for air, which is lower in the order of 1/100 than the permeability coefficient for air of the interconnecting member of comparative example. This means that the interconnecting member of the present invention has a high gas tight property. For example, when this member is used as an interconnector of SOFC, the leakage of fuel or air during the electricity-generating operation is small, and the utilization rate of fuel is improved. Moreover, the interconnecting member of the present invention itself has a high electroconductivity, and can be made into thin film, and hence a fuel cell having a low internal resistance and a high output power can be obtained.

The above described example can be variously modified.

The electroconductive interconnecting member of the present invention can be used in a cylindrical SOFC, self-supporting type cylindrical SOFC, flat plate-shaped SOFC, monolith-structured SOFC and the like.

The dimension, shape and structure of each part of an SOFC, and the connecting method of unit cells, the number of unit cells to be arranged, the arranging method of unit cells and the like of each SOFC can be freely selected.

What is claimed is:

1. An electroconductive interconnecting member consisting of a ceramics material consisting essentially of a mixture of 100 parts by weight of lanthanum chromite having a composition represented by the formula of $LaCrO_3$ with not more than 2.0 parts by weight of the total amount of an oxide or oxides of at least one metal selected from the group consisting of Si, Ti, Fe, Al, Cu, B, Ni, Cr and Mn.

2. An electroconductive interconnecting member consisting of the following ceramics material [I] or ceramics material [II], said ceramics material [I] consisting essentially of lanthanum chromite having a composition represented by the formula of $LaCr_{1-x}A_xO_3$ (wherein A represents at least one metal selected from the group consisting of Ni, Fe and Ti, and x is a numeral within the range of $0 < x \leq 0.3$), and said ceramics material [II] consisting essentially of a mixture of 100 parts by weight of lanthanum chromite having a composition represented by the formula of $LaCr_{1-x}A_xO_3$ (wherein A represents at least one metal selected from the group consisting of Cu, Zn, Ni, Fe and Ti, and x is a numeral within the range of $0 < x \leq 0.3$) with not more than 2.0 parts by weight of the total amount of an oxide or oxides of at least on metal selected from the group consisting of Si, Ti, Fe, Al, Cu, B, Ni, Cr and Mn.

3. A fuel cell having an electroconductive interconnecting member as an interconnector, said electroconductive interconnecting member consisting essentially of a mixture of 100 parts by weight of lanthanum chromite having a composition represented by the formula of $LaCrO_3$ with not more than 2.0 parts by weight of the total amount of an oxide or oxides of at least one metal selected from the group consisting of Si, Ti, Fe, Al, Cu, B, Ni, Cr and Mn.

4. A fuel cell having an electroconductive interconnecting member consisting of the following ceramics material [I] or ceramics material [II] as an interconnector, said ceramics material [I] consisting essentially of lanthanum chromite having a composition represented by the formula of $LaCr_{1-x}A_xO_3$ (wherein A represents at least one metal selected from the group consisting of Ni, Fe and Ti, and x is a numeral within the range of $0 < x \leq 0.3$), and said ceramics material [II] consisting essentially of a mixture of 100 parts by weight of lanthanum chromite having a composition represented by the formula of $LaCr_{1-x}A_xO_3$ (wherein A represents at least one metal selected from the group consisting of Cu, Zn, Ni, Fe and Ti, and x is a numeral within the range of $0 < x \leq 0.3$) with not more than 2.0 parts by weight of the total amount of an oxide or oxides of at least one metal selected from the group consisting of Si, Ti, Fe, Al, Cu, B, Ni, Cr and Mn.

* * * * *